United States Patent [19]
Grosso

[11] Patent Number: 5,201,895
[45] Date of Patent: Apr. 13, 1993

[54] OPTICALLY BEAM STEERED INFRARED SEEKER

[75] Inventor: Vincent A. Grosso, Hopkinton, Mass.

[73] Assignee: Raytheon Company, Lexington, Mass.

[21] Appl. No.: 824,953

[22] Filed: Jan. 23, 1992

[51] Int. Cl.⁵ .............................................. F41G 7/26
[52] U.S. Cl. .................................................. 244/3.16
[58] Field of Search ...................................... 244/3.16

[56] References Cited
U.S. PATENT DOCUMENTS

| | | | |
|---|---|---|---|
| 3,296,443 | 1/1967 | Argyle | 244/3.16 |
| 4,009,393 | 2/1977 | Ashley et al. | 244/3.16 |
| 4,034,949 | 7/1977 | Hoesterey et al. | 244/3.16 |
| 4,326,799 | 4/1982 | Keene et al. | 244/3.16 |
| 4,347,996 | 9/1982 | Grosso | 244/3.16 |
| 4,407,464 | 10/1983 | Linick | 244/3.13 |
| 4,690,351 | 9/1987 | Beckerleg et al. | 244/3.16 |

*Primary Examiner*—Charles T. Jordan
*Attorney, Agent, or Firm*—Donald F. Mofford; Richard M. Sharkansky

[57] ABSTRACT

A seeker is disclosed including a Cassegrainian telescope, responsive to an optical signal having a signal path, for directing the optical signal toward an optical detector. The seeker also includes a first rotatable optical wedge, disposed in the signal path of the optical signal, for directing the optical signal from a first direction toward the Cassegrainian telescope. The seeker further includes a second rotatable optical wedge, disposed in the signal path of the optical signal, for directing said optical signal from a second direction to the first direction. With such an arrangement, a seeker is provided which is capable of surviving a high "G" application and providing a wide field of view. The seeker provides two angular degrees of freedom in polar coordinates for the optical signal just as a two axis gimbal provides two angular degrees of freedom in Cartesian coordinates.

7 Claims, 3 Drawing Sheets

OPTICALLY BEAM STEERED INFRARED SEEKER

BACKGROUND OF THE INVENTION

This invention pertains generally to infrared (IR) seekers and particularly to an IR seeker intended for use as a guidance apparatus within a cannon launched guided projectile.

A guidance system for a spinning projectile is described in U.S. Pat. No. 4,347,996, issued Sep. 7, 1982 to V. A. Grosso and assigned to the same assignee as this application.

An IR, high G hardened, strapped-down seeker intended for use as the sensor in a cannon-launched spin-stabilized guided missile is described in U.S. Pat. No. 4,690,351, issued Sep. 1, 1987 to R. A. Beckerleg, et al. (which patent is assigned to the same assignee as this application and is incorporated herein by reference). In U.S. Pat. No. 4,690,351, a strapped-down IR seeker is described comprising a catadioptric optical telescope that is fixed to the body of the projectile but whose optical axis is inclined at an angle; e.g. 6°, with respect to the centerline of the projectile. The spin of the projectile is utilized to scan an annular ring of the target area. An optical wedge (a small angle prism) serves as the IR dome during the terminal phase of flight. The wedge is rotated ±90° about the projectile spin axis to steer the seeker line-of-sight, LOS, radially from the projectile centerline to twice the fixed off-axis optical angle; e.g., 12°. The steering by wedge rotation performs the gimbaling function. Thus, the projectile spin motion scans a circular annular pattern and the radius of the pattern is varied by controlling the position of the rotating optical wedge. The resultant pattern for discrete wedge rotation angles is a series of concentric annuli. For linear wedge rotation a spiral search pattern is generated. The position of the servo in the wedge is controlled by a data processor. The processor first generates the seeker search commands. Once a target is detected, the wedge position is commanded to the next expected radial position and a track mode commences. In the track mode, target line-of-sight measurements are made by differencing sequential line-of-sight positions to generate a line-of-sight rate output for the target. To provide adequate optical wedge strength during high G induced loads, the wedge is prestressed by a metal band or ring. A controlled shrink fit method of application is used. The steering of the LOS by the wedge allows a light weight and small field of view telescope to be used to cover the complete search and track area and only a few optical infrared detectors are required.

Although such a strapped-down IR seeker is useful in many applications, the seeker has some limitations. For example, the seeker can only be used on a rapidly spinning projectile. Additionally, the data rate is a variable and becomes excessive at high spin rates and large off boresight error angles.

SUMMARY OF THE INVENTION

With the foregoing background of this invention in mind, it is a primary object of this invention to provide an IR seeker with an image on detector which remains in focus within a broad angular field.

Another object of this invention is to provide a strapped-down IR seeker which can be used with either a spinning or non-spinning airframe.

Still another object of this invention is to provide an improved strapped-down seeker.

The foregoing and other objects of this invention are met generally by a seeker including a Cassegrainian telescope, responsive to an optical signal having a signal path, for directing the optical signal toward an optical detector. The seeker also includes a first rotatable optical wedge, disposed in the signal path of the optical signal, for directing the optical signal from a first direction toward the Cassegrainian telescope. The seeker further includes a second rotatable optical wedge, disposed in the signal path of the optical signal, for directing said optical signal from a second direction to the first direction. With such an arrangement, a seeker is provided which is capable of surviving a high "G" application and providing a wide field of view. The seeker provides two angular degrees of freedom in polar coordinates for the optical signal just as a two axis gimbal provides two angular degrees of freedom in cartesian coordinates.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
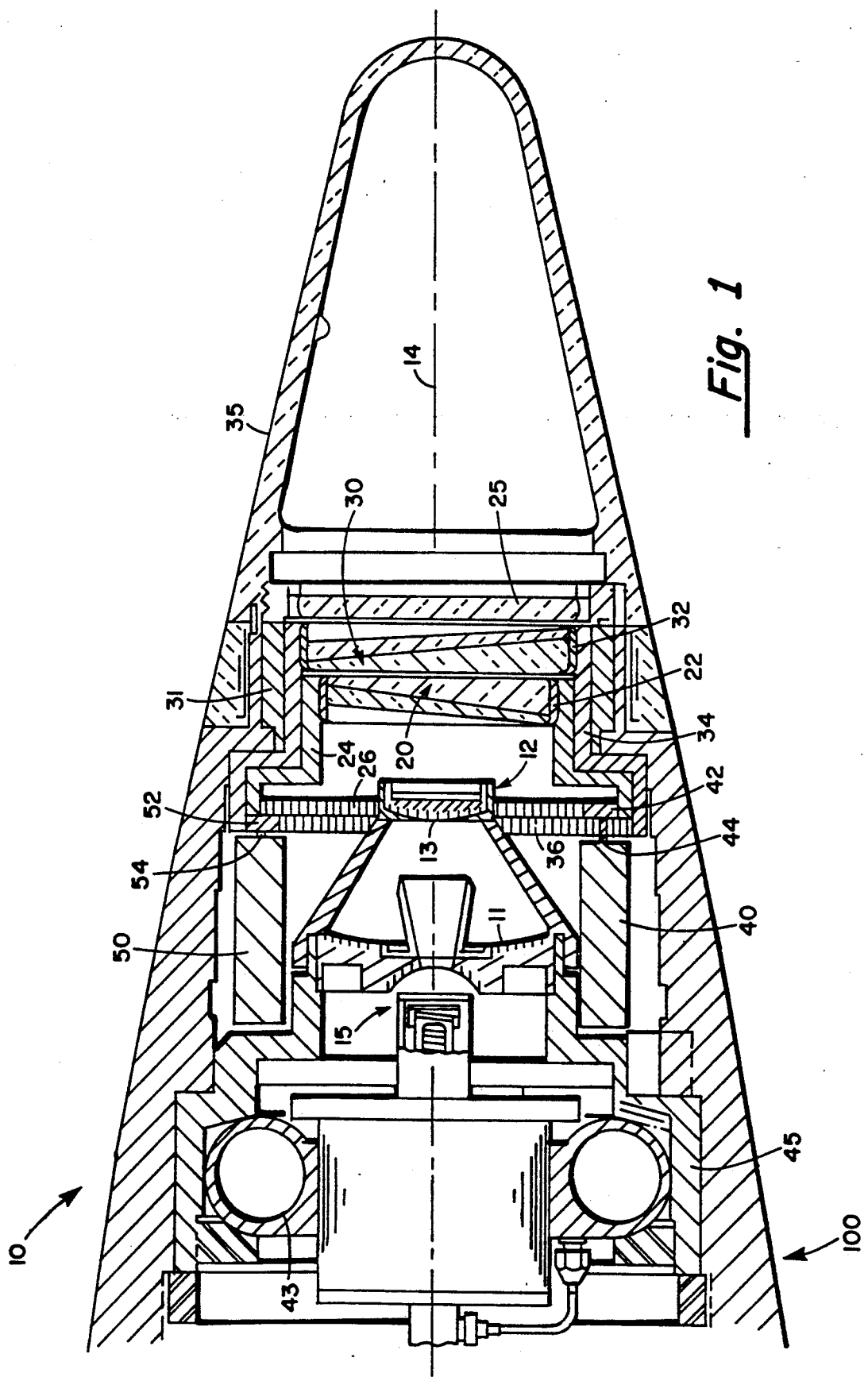
FIG. 1 is a cross-sectional view of an optical seeker according to this invention.

Referring now to FIG. 1, a projectile 100 having a seeker 10 (here a strapped-down IR seeker) according to this invention includes a Cassegrainian-type telescope 12 including a primary mirror 11 and a secondary mirror 13. The Cassegrainian-type telescope 12 is fixed to the body of the projectile 100 with an optical axis (longitudinal axis) of the telescope 12 coincident with the centerline 14 of the projectile 100. Optical signals received by the telescope 12 are reflected off the primary and secondary mirrors 11, 13, respectively, to optical detectors (not shown) disposed within a cryogenically-cooled detector assembly 15. The cryogenically-cooled detector assembly 15 includes here a 64×64 pixel focal plane detector array responsive to the optical signals incident thereon. Alternately, a first linear array of detectors responsive to an optical signal (typically infrared radiation) in a first frequency band of signals and a second linear array of detectors responsive to an optical signal in a second frequency band of signals could be used as well as other detector array arrangements.

A first rotatable optical wedge 20 (hereinafter referred to as wedge 20) is disposed along the longitudinal axis of the telescope 12 fore of the telescope 12. A second rotatable optical wedge 30 (hereinafter referred to as wedge 30) is disposed along the longitudinal axis of the telescope 12 fore of the first rotatable optical wedge 20. The radius of the scan pattern of the seeker 10 is controlled by rotating the wedge 20 and the wedge 30. Thus, the line-of-sight (LOS) of the seeker 10 is controlled by the wedge 20 and the wedge 30, as described further hereinafter.

The wedge 20 and the wedge 30 are here fabricated from zinc sulfide and calcium fluoride to avoid excessive chromatic aberration when used in an IR seeker. A primary portion (here the fore portion) of the wedge 20 and a primary portion (here the aft portion) of the wedge 30 is fabricated from zinc sulfide with a vertex angle of 6.4 degrees. A secondary portion (here the aft portion) of the wedge 20 and a secondary portion (here the fore portion) of the wedge 30 are fabricated from calcium fluoride with a vertex angle of 5.3 degrees. The wedge 30 is disposed opposite with the wedge 20 with external surfaces not being orthogonal to an outgoing beam to reduce reflective backscatter. With the above-described arrangement, a maximum defection angle of 12 degrees is obtained, with a total field of view of 24 degrees. It should be appreciated, by increasing the vertex angles of the wedges, the maximum deflection angle is increased.

The wedge 20 and the wedge 30 are pre-stressed and within a Kovar metal rim 22, 32 respectively, such that each wedge is under compression. Additionally, the coefficient of thermal expansion of the Kovar metal rims 22,32, are closely matched to that of the respective wedges 20, 30. The pre-stressing places each wedge in compression preventing either wedge from being in tension where the wedge is weak mechanically during high G loading. By changing the orientation of the wedge 20 relative to the orientation of the wedge 30, an optical beam can be steered over a large field of view. Additionally, if both wedge 20 and wedge 30 are rotated at the same angular rotation rate while maintaining a fixed relative angular position to each other, then the optical beam can be rotated about the centerline 14 of the projectile 100 at the rotation rate of the wedges 20, 30. With such an arrangement, the seeker 10 provides two angular degrees of freedom in polar coordinates for the optical beam, just as a two axis gimbal (not shown) provides two angular degrees of freedom in cartesian coordinates. A window 25 is disposed fore of the wedge 30 to protect the seeker 10 from the environment. The window 25 is fabricated from bulk diamond having good thermal conductivity and hardness. Edge cooling of the window 25 reduces the temperature at the center of the window 25 during flight, thus reducing resolution degradation, lensing effects and oxidation. The close proximity of the wedges 20, 30 to the window 25 reduces the required size of the window 25.

Figure 2:
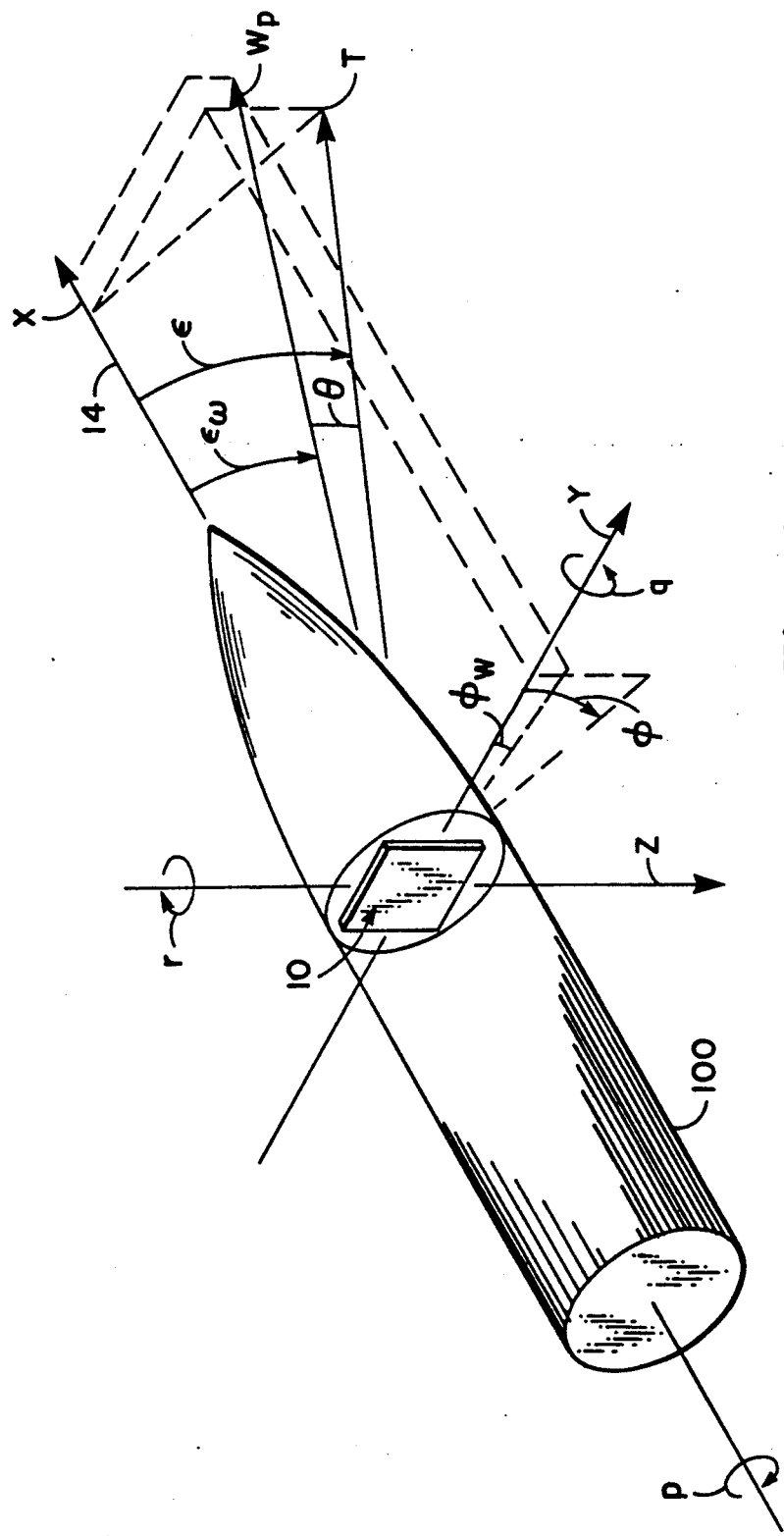
FIG. 2 is a sketch useful in understanding a coordinate system used to describe the invention.

Referring now to FIG. 2, a fixed Cartesian system having an X, Y and Z coordinate is shown. The X coordinate is directed along the longitudinal centerline 14 of the projectile 100 which is also the centerline of the Cassegrainian-type telescope 12 (FIG.1). The seeker 10 views a target, T, along a unit vector with spherical coordinates of $\epsilon$ and $\phi$ relative to the X, Y and Z axis. The wedges 20, 30 (FIG. 1) direct the instantaneous field-of-view (FOV) of the seeker 10 along an optical beam unit vector $W_p$ (also referred to as a wedge pointing vector) having the spherical coordinates $\epsilon_w$, $\phi_w$. The beam pointing angle off boresight, $\epsilon_w$, is controlled by a differential rotation of the wedge 20 (FIG. 1) with respect to the rotation of the wedge 30 (FIG. 1). The roll position angle, $\phi_w$, of the beam is controlled by rotating both wedges 20, 30 (FIG. 1) together relative to the projectile 100. It should be noted that if plane angle wedges are used, the relative rotation of one wedge with respect to the other wedge, produces a non-linear change in the beam pointing angle, $\epsilon_w$. To provide the required linearity, compensation circuity (not shown) is used to provide the required linearity. All target scene information is observed in the coordinate system as shown, which has an instantaneous angular rate $\omega$ with an X, Y and Z component of p, q and r, respectively. The components ($X_w$, $Y_w$ and $Z_w$) of the unit vector along the wedge pointing direction (Wp) are:

$$X_w = \cos \epsilon_w \qquad \text{(Eq. 1)}$$

$$Y_w = \sin \epsilon_w \cos \phi_w \qquad \text{(Eq. 2)}$$

$$Z_w = \sin \epsilon_w \sin \phi_w \qquad \text{(Eq. 3)}$$

The vertical angular rate of change with respect to time of the unit vector along the wedge pointing direction ($W_p$) in the described coordinate system is:

$$\frac{dW_p}{dt} = \frac{\partial W_p}{\partial t} + \omega X W_p \qquad \text{(Eq. 4)}$$

By differentiating equations 1, 2 and 3 with respect to time, the expression $\partial W_p/\partial t$ becomes:

$$\frac{\partial W_p}{\partial t} = (-\sin \epsilon_w \dot\epsilon_w)i + \qquad \text{(Eq. 5)}$$
$$(\cos \epsilon_w \cos \phi_w \dot\epsilon_w - \sin \epsilon_w \sin \phi_w \dot\phi_w)j +$$
$$(\cos \epsilon_w \sin \phi_w \dot\epsilon_w - \sin \epsilon_w \cos \phi_w \dot\phi_w)k$$

and the expression $\omega X\, W_p$ becomes:

$$\omega X\, W_p = (q \sin \epsilon_w \sin \phi_w - r \sin \epsilon_w \cos \phi_w)i - (p \sin \epsilon_w \sin \phi_w - r \cos \epsilon_w)j + (p \sin \epsilon_w \cos \phi_w - q \cos \epsilon_w)k \qquad \text{(Eq. 6)}$$

By adding the like components of equations (5) and (6), equations (4) in terms of the X, Y and Z components becomes:

$$dW_p/dt = (-\sin \epsilon_w \dot\epsilon_w + q\sin \epsilon_w \sin \phi_w - r\sin \epsilon_w \cos \phi_w)i + \qquad \text{(Eq. 7)}$$
$$(\cos \epsilon_w \cos \phi_w \dot\epsilon_w - \sin \epsilon_w \sin \phi_w \dot\phi_w - p\sin \epsilon_w \sin \phi_w + r\cos \epsilon_w)j +$$
$$(\cos \epsilon_w \sin \phi_w \dot\epsilon_w + \sin \epsilon_w \cos \phi_w \dot\phi_w + p\sin \epsilon_w \cos \phi_w - q\cos \epsilon_w)k$$

The components ($X_1$, $Y_1$ and $Z_1$) of the unit vector along the target LOS direction, T, are:

$$X_1 = \cos \epsilon \qquad \text{(Eq. 8)}$$

$$Y_1 = \sin \epsilon \cos \phi \qquad \text{(Eq. 9)}$$

$$Z_1 = \sin \epsilon \sin \phi \qquad \text{(Eq. 10)}$$

An expression for the boresight error angle $\theta$, which is the angle between the unit vector of the wedge pointing direction, $W_p$, and the unit vector along the target LOS direction, T, is obtained from their vector cross product:

$$(W_p)(T) \sin \theta = W_p X\, T \qquad \text{(Eq. 11)}$$

For small boresight angles provided by a good tracking loop, $\sin \theta$ is equal to $\theta$ thus performing the required vector cross product with Equation 1, 2, 3, 8, 9 and 10:

$$\sin \theta = \theta = (\sin \epsilon_w \cos \phi_w \sin\epsilon\sin\phi - \sin \epsilon_w \sin \phi_w \sin\epsilon\cos\phi)i - \qquad \text{(Eq. 12)}$$
$$(\cos \epsilon_w \sin\epsilon\sin\phi - \cos\epsilon\sin \epsilon_w \sin \phi_w)j +$$

-continued $$(\cos \epsilon_w \sin\epsilon\cos\phi - \cos\epsilon\sin \epsilon_w \cos \phi_w)k$$

The i, j, k components of $\theta$ define a unit vector U perpendicular to the plane of $W_p$ and T so directed that a right handed screw driven in the direction U would carry $W_p$ into T eliminating the angle $\theta$.

In order to track the target, an inertial optical beam rate proportional to $\theta$ and in the direction of U is commanded. Therefore, in the direction of U:

$$\frac{dW_p}{dt} = K\theta \quad \text{(Eq. 13)}$$

Multiplying the i, j and k terms of Equation (12) by K and equating to the like terms of Equation (7) the three terms for the inertial optical beam rate proportional to $\theta$ are:

$$K(\sin \epsilon_w \cos \phi_w \sin\epsilon\sin\phi - \sin \epsilon_w \sin \phi_w \sin\epsilon\cos\phi) = \quad \text{(Eq. 14)}$$

$$(-\sin \epsilon_w\dot\epsilon_w + \dot{q}\sin \epsilon_w \sin \phi_w - r\sin \epsilon_w \cos \phi_w)$$

$$-K(\cos \epsilon_w \sin\epsilon\sin\phi - \cos\epsilon\sin \epsilon_w \sin \phi_w) = \quad \text{(EQ. 15)}$$

$$(\cos \epsilon_w \cos \phi_w\dot\epsilon_w - \sin \epsilon_w \sin \phi_w\dot\phi_w - p\sin \epsilon_w \sin \phi_w + r\cos \epsilon_w)$$

$$K(\cos \epsilon_w \sin\epsilon\cos\phi - \cos\epsilon\sin \epsilon_w \cos \phi_w) = \quad \text{(EQ. 16)}$$

$$(\cos \epsilon_w \sin \phi_w\dot\epsilon_w + \sin \epsilon_w \cos \phi_w\dot\phi_w + p\sin \epsilon_w \cos \phi_w - \dot{q}\cos \epsilon_w)$$

Equation (14) can be solved directly for the differential wedge drive rate $\dot\delta_w$ to track the target in boresight yielding:

$$\dot\epsilon_w = -K \sin \epsilon \sin (\phi - \phi_w) + q \sin \phi\omega - r \cos \phi\omega \quad \text{(Eq. 17)}$$

Equations (15) and (16) can be solved simultaneously for the equal wedge rate $\dot\phi_w$ to drive both wedges to track the target in roll position angle yielding:

$$\dot\phi_w = -p + (r \sin \phi_w + q \cos \phi_w)/(\tan \epsilon_w) + K(\sin \epsilon\cos (\phi_w - \phi))/(\tan \epsilon_w) \quad \text{(Eq. 18)}$$

Equations (17) and (18) are for inertially stabilized optical beam steered dedicated tracking of the target after target acquisition and selection has taken place. For target search and track while scan, Equation (18) can be replaced by Equation (19) below. Search scan can be accomplished with a constant inertial scan rate using Equation (20) below or with a variable inertial scan rate as a function of $\epsilon$ to maintain a constant pixel scan rate, Equation (21) can be used.

$$\dot\phi_w = -p + (r \sin \phi_w + q \cos \phi_w)/(\tan \epsilon_w) + \dot\phi_s \quad \text{(Eq. 19)}$$

Where:

$$\dot\phi_s = a\ constant \quad \text{(Eq. 20)}$$

for a constant inertial angular scan rate, and $$\dot\phi_s = f(\epsilon) \quad \text{(Eq. 21)}$$

for a constant pixel rate.

Referring now again to FIG. 1, the wedge 20 and the Kovar ring 22 are connected to a cylindrical member 24 by any known means. For example, a compression fit reinforced with epoxy could be used or alternatively, by means of a threaded ring. The wedge 30 and the Kovar ring 32 are connected to a cylindrical member 34 in a like manner. A plurality of teeth 26 are disposed circumferentially about an aft end portion of an inner wall of the cylindrical member 24 as shown. A gear 42 is affixed to a shaft 44 of an inner drive servo motor 40 (hereinafter referred to as motor 40) such that the gear 42 is engaged by the plurality of teeth 26. Thus, the motor 40 is effective to rotate the wedge 20 about the center axis of the projectile 100. In a like manner, a plurality of teeth 36 are disposed circumferentially about an aft end portion of an inner wall of the cylindrical member 34 as shown. A gear 52 is affixed to a shaft 54 of an outer drive servo motor 50 (hereinafter referred to as motor 50) such that the gear 52 is engaged by the plurality of teeth 36. Thus, the motor 50 is effective to rotate the wedge 30 about the center axis of the projectile 100. The cylindrical member 34 is rotatably supported within the projectile 100 by means of a journal bearing 31 and the cylindrical member 24 is rotatably supported within the projectile 100 by the cylindrical member 34.

In an alternative embodiment, the cylindrical member 34 is connected to a rotor of a DC servo motor in a manner as described in U.S. Pat. No. 4,690,351. The DC servo motor is effective to rotate the optical wedge 30 about the axis of the projectile 100. The cylindrical member 24 is also connected to a rotor of a DC servo motor which is effective to rotate the optical wedge 20 about the axis of the projectile 100. Control circuitry is effective to control both of the DC servo motors which in turn control the positional relationship between the wedges 20, 30.

An inner gear code reader (not shown) and an outer gear code reader (not shown) are disposed juxtaposed the respective aft end portions of the cylindrical members 24, 34 to measure the position of the respective wedges 20,30 with respect to the body of the projectile 100. The inner gear code reader and the outer gear code reader, here, are provided by a pair of optical sensors (not shown) which reads a grey code (not shown) disposed on the respective aft end portions of the cylindrical members 24, 34.

Completing the seeker 10 is an ejectable nose cone 35 attached in a known manner to the front end of the projectile 100. Just prior to the start of the seeker search mode, the nose cone 35 is separated from the body of the projectile 100 in a known manner. Within the projectile 100, high pressure nitrogen for the cryogenically cooled detector assembly 15 is stored in an annular gas storage bottle 43. Disposed within a housing 45 and the annular gas storage bottle 43 are detector preamplifiers (not shown) and associated circuitry to process detected signals.

With the above-described arrangement, a mechanical advantage in angle is obtained, allowing more precise steering. For example, in the present embodiment with a 24 degrees field of view, a 180 degree rotation of the wedges 20, 30 with respect to one another sweeps the wedge pointing direction the entire 24 degrees. The latter provides a mechanical advantage of 7.5. Alternatively, the field of view can be increased, for example to 45 degrees, but the mechanical advantage would be decreased to 4. Likewise, various rates of spin of the wedges 20, 30 can be observed, with preferred rates varying between 100 Hz and 300 Hz, to provide sufficient dwell time on potential targets.

It should now be apparent, that steering of the wedge pointing direction is provided by the wedges 20, 30 and since the steering occurs close to the window 25, the size of the window 25 is reduced and vignetting is reduced. Additionally, the seeker 10 is more compact and less susceptible to pointing errors from missile shock than that associated with a gimbal arrangement.

Figure 3:
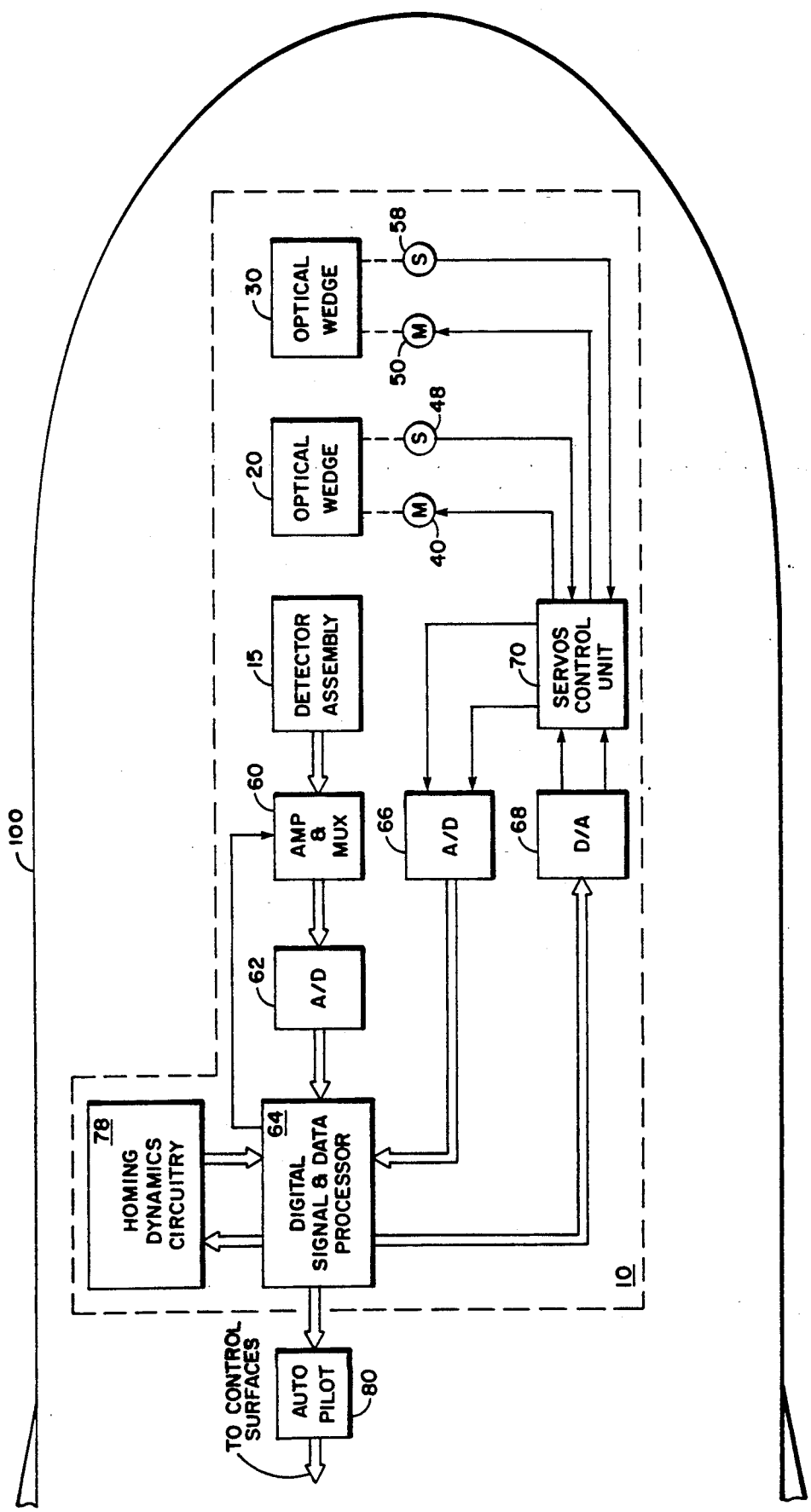
FIG. 3 is a simplified block diagram of the signal processing required according to the invention.

Referring now to FIG. 3, a block diagram of the projectile 100 is shown to include the seeker 10 having the wedge 20 and the wedge 30 disposed fore of the detector assembly 15. As described hereinabove, the motor 40 controls the rotation of wedge 20 and the motor 50 controls the rotation of wedge 30. An inner gear code reader 48 measures the position of the wedge 20 with respect to the body of the projectile 100 and an outer gear code reader 58 measures the position of the wedge 30 with respect to the body of the projectile 100. A servos control unit 70, in response to control signals from a digital signal and data processor 64 via a digital-to-analog converter 68 provides appropriate signals to motor 40 and motor 50 such that motor 40 rotates wedge 20 as desired and motor 50 rotates wedge 30 as desired. The inner gear code reader 48 feeds a signal to the servos control unit 70 which feeds the signal to the digital signal and data processor 64 (hereinafter referred to as processor 64) via an analog-to-digital converter 66 (A/D 66) to provide the processor 64 the position of wedge 20. The outer gear code reader 58 feeds a signal to the servos control unit 70 which feeds the signal to the processor 64, via the A/D 66 to provide the processor 64 the position of wedge 30.

The detector assembly 15, in response to optical signals incident thereon, provides output signals to an input of amplifying and multiplexer circuitry 60 wherein said signals are amplified and time multiplexed onto a single channel in response to a control signal provided by the processor 64. The multiplexed data from the amplifying and multiplexer circuitry 60 are digitized in an analog-to-digital converter 62 and fed to the processor 64 using known techniques.

The processor 64 is of conventional design and includes a series of high and low pass digital filters and comparators that are effective to apply spatial, spectral and amplitude discriminants to the input data in order to separate targets from clutter and countermeasures. The processor 64 further processes said signals for final target detection, track and guidance processing as generated by homing dynamics circuitry 78 in a manner known in the art. In response to said processed signals, the processor 64 provides control signals to an autopilot 80 which provides control signals to control surfaces (not shown) to control the course of the projectile 100. In addition, the processor 64 provides, via the digital-to-analog converter 68, control signals to the servos control unit 70 to control the motors 40, 50 which control the position of wedge 20 and wedge 30, respectively. When the seeker 10 is used within a spinning projectile, the digital signal and data processor 64 compensates for such spinning when providing control signals to control the rotation of wedge 20 and wedge 30.

With such an arrangement, the wedge 20 and the wedge 30 control the instantaneous field-of-view of the seeker 10 by changing the orientation of wedge 20 relative to wedge 30 as well as rotating both wedges 20 and 30 together relative to the body of the projectile 100.

Having described this invention, it will now be apparent to one of skill in the art that changes may be made without departing from the concept of providing a first rotatable optical wedge disposed along a longitudinal axis of a Cassegrainian telescope for directing an optical signal in a first direction and a second rotatable optical wedge disposed along the longitudinal axis of the Cassegrainian telescope for directing the optical signal from said first direction to a second direction thus providing two angular degrees of freedom in polar coordinates for the optical signal just as a two axis gimbal provides two angular degrees of freedom in cartesian coordinates. It is felt, therefore, that this invention should not be restricted to its disclosed embodiment, but rather should be limited only by the spirit and scope of the appended claims.

What is claimed is:

1. A seeker comprising:
   (a) a first rotatable optical wedge having a rotational position;
   (b) a second rotatable optical wedge having a rotational position, the second rotatable optical wedge disposed juxtapositional with the first rotatable optical wedge;
   (c) means, connected tot eh first and second rotatable optical wedges, for controllign the rotational position of the first rotatable optical wedge with respect to the rotational position of the second rotatable optical wedge, wherein the controlling means comprises:
      (i) means, connected to the first rotatable optical wedge, for moving the rotational position of the first rotatable optical wedge;
      (ii) means, connected to the second rotatable optical wedge, for moving the rotational position of the second rotatable optical wedge;
      (iii) means for providing a signal indicative of the rotational position of the first rotatable optical wedge; and
      (iv) means for providing a signal indicative of the rotational position of the second rotatable optical wedge; and
   (d) wherein each of the first and the second rotatable optical wedges comprises a first portion fabricated from a first material and a second portion fabricated from a second different material.

2. The seeker as recited in claim 1 further comprising a Cassegrainian-type telescope disposed juxtapositional the first rotatable optical wedge.

3. The seeker as recited in claim 1 wherein the first material is zonc sulfide and the second different material is calcium fluoride.

4. A seeker comprising:
   (a) a first rotatable optical wedge having a rotational position;
   (b) a second rotatable optical wedge having a rotational position, the second rotatable optical wedge dispsoed juxtapositional with the first rotatable optical wedge;
   (c) means, connected to the first and second rotatable optical wedges, for controllig the rotational position of the first rotatable optical wedge with respect to the rotational position of the second rotatable optical wedge, wherein the controlling means comprises:
      (i) means, connected to the first rotatable optical wedge, for moving the rotational position of the first rotatable optical wedge;
      (ii) means, connected to the second rotatable optical wedge, for movign the rotational position of the second rotatable optical wedge;
      (iii) means for providign a signal indicative of the rotational position of the first rotatable optical wedge; and (iv) means for providing a signal indicative of the rotational position of the second rotatable optical wedge; and (d) a first and second cylindrical member having a grey code disposed thereon, the first cylindrical member disposed about the first rotatable optical wedge and the second cylindrical member disposed about the second rotatable optical wedge and wherein the means for providing a signal indicative of the rotational position of the first rotatable optical wedge comprises an optical sensor disposed adjacent the grey code of the first cylindrical member and wherein the means for providing a signal indicative of the rotational position of rthe second rotatable optical wedge comprises an optical sensor disposed adjacent the grey code of the second cylindrical member.

5. A seeker comprising:
(a) first means, responsive to an optical signal having a signal path, for directing the optical signal toward an optical detector, wherein the first means comprises a Cassegrainian-type telescope;
(b) second means, dispsoed in the signal path of the optical signal, for directing said optical signal from a first direction toward the first directing means; and
(c) third means, disposed in the signal path of the optical signal, for directing said optical signal from a second direction to the first direction; and
(d) wherein the second and third directing means each comprises:

(i) a wedge of refractive material having a first portion comprising a first material and a second portion comprising a second different material;
(ii) a cylindrical member disposed about the wedge, the cylindrical member having teeth disposed on an aft portion thereof;
(iii) a motor having a shaft with a gear, the gear engaging the teeth; and
(iv) a sensor disposed adjacent the cylindrical member, the sensor having an output signal indicative of angular position of the wedge.

6. The seeker as recited in claim 5 wherein the first portion is fabricated from zinc sulfide and the second portion is fabricated from calcium fluoride.

7. a seeker comprising:
(a) a detector assembly having a plurality of optical detectors;
(b) a Cassegrainian-type telescope having a field of view and a focal point, the focal point disposed coincident with the detector assembly;
(c) a first rotatable optical wedge having a rotational position, the first rotatable optical wedge comprising a first portion fabricated from a first material and a second portion fabricated from a second different material, the first rotatable optical wedge disposed in the field view of the Cassegrainian-type telescope; and
(d) a second rotatable optical wedge having a rotational position, the second rotatable optical wedge comprising a first portion fabricated from a first material and a second portion fabricated from a second different material, the second rotatable optical wedge disposed juxtapositional with the first rotatable optical wedge.

* * * * *